(12) United States Patent
Li et al.

(10) Patent No.: US 10,194,451 B2
(45) Date of Patent: Jan. 29, 2019

(54) CHANNEL DETECTION NOTIFICATION METHOD, APPARATUS AND BASE STATION

(71) Applicant: Yulong Computer Telecommunication Scientific (Shenzhen) Co., Ltd., Shenzhen, Guangdong (CN)

(72) Inventors: Mingju Li, Guangdong (CN); Yajun Zhu, Guangdong (CN); Yixue Lei, Guangdong (CN); Yunfei Zhang, Guangdong (CN)

(73) Assignee: Nanchang Coolpad Intelligent Technology Company Limited, Nanchang, Jiangxi (CN)

( * ) Notice: Subject to any disclaimer, the term of this patent is extended or adjusted under 35 U.S.C. 154(b) by 85 days.

(21) Appl. No.: 15/641,750

(22) Filed: Jul. 5, 2017

(65) Prior Publication Data

US 2017/0303288 A1 Oct. 19, 2017

Related U.S. Application Data

(63) Continuation-in-part of application No. PCT/CN2015/075560, filed on Mar. 31, 2015.

(30) Foreign Application Priority Data

Jan. 12, 2015 (CN) .......................... 2015 1 0014487

(51) Int. Cl.
*H04W 72/08* (2009.01)
*H04L 5/00* (2006.01)
(Continued)

(52) U.S. Cl.
CPC .......... *H04W 72/085* (2013.01); *H04B 17/30* (2015.01); *H04L 5/001* (2013.01);
(Continued)

(58) Field of Classification Search
CPC ............... H04W 72/085; H04W 72/14; H04W 28/0278; H04W 72/0453; H04W 88/06; H04W 88/08; H04L 5/0048
See application file for complete search history.

(56) References Cited

U.S. PATENT DOCUMENTS

2014/0185497 A1 7/2014 Wolf et al.
2017/0215191 A1* 7/2017 Martin ............... H04W 72/0453

FOREIGN PATENT DOCUMENTS

CN 102325005 A 1/2012
CN 102421149 A 4/2012
(Continued)

*Primary Examiner* — Kevin C. Harper
*Assistant Examiner* — Henry Baron
(74) *Attorney, Agent, or Firm* — Young Basile Hanlon & MacFarlane, P.C.

(57) ABSTRACT

Provided is a channel detection notification method when a LTE system works at an unauthorized frequency band, a system and a base station. The channel detection notification method includes the follows. A primary cell base station receives RRM measuring results of multiple base stations at the unauthorized frequency band reported by a terminal; according to the RRM measuring results of the multiple base stations, a secondary cell base station is selected for the terminal; if it is determined that downlink traffic reaches a set first traffic threshold value, the secondary cell base station is informed to conduct downlink channel detection at the unauthorized frequency band; and if it is determined that uplink traffic reaches a set second traffic threshold value, the secondary cell base station and/or the terminal is informed to conduct uplink channel detection at the unauthorized frequency band.

20 Claims, 7 Drawing Sheets

(51) Int. Cl.
*H04W 28/02* (2009.01)
*H04W 72/04* (2009.01)
*H04W 72/14* (2009.01)
*H04W 88/08* (2009.01)
*H04W 88/06* (2009.01)
*H04B 17/30* (2015.01)
*H04W 74/08* (2009.01)
*H04L 27/00* (2006.01)
*H04W 16/14* (2009.01)
*H04W 24/10* (2009.01)
*H04W 72/12* (2009.01)

(52) U.S. Cl.
CPC .......... *H04L 5/0091* (2013.01); *H04L 5/0098* (2013.01); *H04L 27/0006* (2013.01); *H04W 16/14* (2013.01); *H04W 24/10* (2013.01); *H04W 28/0278* (2013.01); *H04W 72/0453* (2013.01); *H04W 72/14* (2013.01); *H04W 74/0808* (2013.01); *H04L 5/0048* (2013.01); *H04W 72/1231* (2013.01); *H04W 72/1252* (2013.01); *H04W 88/06* (2013.01); *H04W 88/08* (2013.01)

(56) References Cited

FOREIGN PATENT DOCUMENTS

| | | |
|---|---|---|
| CN | 102484855 A | 5/2012 |
| CN | 102595543 A | 7/2012 |
| CN | 103460740 A | 12/2013 |
| CN | 103686823 A | 3/2014 |
| CN | 103875187 A | 6/2014 |
| WO | 2014/023458 A | 2/2014 |
| WO | 2014025302 A1 | 2/2014 |

\* cited by examiner

CHANNEL DETECTION NOTIFICATION METHOD, APPARATUS AND BASE STATION

CROSS-REFERENCE TO RELATED APPLICATION(S)

This application is a continuation-in-part of International Application No. PCT/CN2015/075560, filed on Mar. 31, 2015, which claims priority to Chinese Patent Application No. 201510014487.3, filed on Jan. 12, 2015, the contents of both of which are herein incorporated by reference in their entireties.

TECHNICAL FIELD

The present disclosure relates to communication technical field, and particularly to a channel detection notification method when a LTE system works at an unauthorized frequency band, a channel detection notification apparatus when a LTE system works at an unauthorized frequency band, and a base station.

BACKGROUND

With a sharp increase of communication traffic, the authorized spectrum of 3GPP (3rd Generation Partnership Project) is increasingly insufficient to provide higher network capacity. To further improve the utilization rate of spectrum resources, 3GPP discusses that how to use unauthorized spectrum with the help of authorized spectrum such as 2.4 GHz and 5 GHz frequency bands. These unauthorized spectrums are currently mainly used by systems of Wi-Fi, blue-tooth, radar, medical and the like.

Generally, access technologies like LTE (Long Term Evolution) designed for an authorized frequency band are unsuitable for use at unauthorized frequency bands, because access technologies such as LTE has high requirements on spectrum efficiency and user experience optimization. Nevertheless, CA (Carrier Aggregation) function makes it possible to deploy LTE at unauthorized frequency bands. 3GPP has put forward the concept of LAA (LTE Assisted Access), which can use unauthorized spectrum with the help of LTE authorized spectrum. While the unauthorized spectrum has two operating manners, one is SDL (Supplemental Downlink), namely there is only downlink transmitting sub-frame; the other is TDD (Time Division Duplexing), which includes both downlink sub-frames and uplink sub-frames. SDL can only be used with the help of CA technique. However, TDD can be used with the help of CA, DC (Dual Connectivity) or be used independently.

Compared with Wi-Fi system, a LTE system working at the unauthorized frequency band can provide higher spectrum efficiency and greater coverage effect. Besides, data traffic can be seamlessly switched between the authorized frequency band and the unauthorized frequency band based on the same core network. This means better broadband experience, higher speed, better stability and mobile convenience for users.

SUMMARY

Based on as least one of the above-mentioned technical problems, the present disclosure proposes a new channel detection notification scheme when a LTE system works at an unauthorized frequency band, so that when the LTE system works at the unauthorized frequency band, channel detection is managed by a primary cell base station uniformly; in this way, the time delay of channel detection of a secondary cell base station and/or a terminal can be effectively reduced, and the accuracy of determining the timing of channel detection can be improved, which can improve the resource utilization rate when the LTE system works at the unauthorized frequency band.

In view of this, the present disclosure provides a channel detection notification method when a LTE system works at an unauthorized frequency band, the method is applicable to a base station and includes the follows. A primary cell base station receives RRM (Radio Resource Management) measuring results of multiple base stations at the unauthorized frequency band reported by terminal; according to the RRM measuring results of the multiple base stations, a secondary cell base station is selected for the terminal; if it is determined that downlink traffic reaches a set first traffic threshold value, the secondary cell base station is informed to conduct downlink channel detection at the unauthorized frequency band; and if it is determined that uplink traffic reaches a set second traffic threshold value, the secondary cell base station and/or the terminal is informed to conduct uplink channel detection at the unauthorized frequency band.

In this technical solution, the primary cell base station triggers the secondary cell base station and/or the terminal to conduct channel detections according to the size of the traffic. Therefore, the communication of the LTE system working at the unauthorized frequency band is managed by the primary cell base station uniformly, the time delay of channel detection of the secondary cell base station and/or the terminal can be effectively reduced, and the accuracy of determining the timing of channel detection can be improved, which can improve the resource utilization rate when the LTE system works at the unauthorized frequency band.

The RRM includes RSRP (Reference Signal Receiving Power) and RSRQ (Reference Signal Receiving Quality).

When the secondary cell base station and/or the terminal are informed to conduct channel detection, the manner in which the secondary cell base station and/or the terminal conduct channel detection can be specified. Specifically, the procedure of informing the secondary cell base station and/or the terminal to conduct channel detection at the unauthorized frequency band includes the following two manners.

Manner One

The secondary cell base station and/or the terminal are informed to repeat channel detection at a fixed period at the unauthorized frequency band. Namely, the secondary cell base station and/or the terminal are informed to conduct channel detection using a LBT mechanism based on frame structure (in other words, LBT mechanism of frame based equipment (FBE)).

Manner Two

The secondary cell base station and/or the terminal are informed to conduct channel detection at the unauthorized frequency band when receiving the traffic to be transmitted. Namely, the secondary cell base station and/or the terminal are informed to conduct channel detection using a LBT mechanism based on load (in other words, a LBT mechanism of load based equipment (LBE)).

In the above-mentioned technical solution, as one implementation, after choosing the secondary cell base station for the terminal, and before informing the secondary cell base station and/or the terminal to conduct channel detection, the method further includes: an adding instruction of the secondary cell base station is sent to the terminal, so that the terminal can be informed that communication service is provided by the secondary cell base station.

In the above-mentioned technical solution, as one implementation, if the secondary cell base station and/or the terminal are informed to repeat channel detection at a fixed period at the unauthorized frequency band, the adding instruction includes a start time of channel detection of the secondary cell base station and/or the terminal and at least three of the following parameters: channel detection duration, channel detection period, maximum channel occupancy time, and idle time. If the secondary cell base station and/or the terminal are informed to conduct channel detection at the unauthorized frequency band when receiving the traffic to be transmitted, the adding instruction includes the channel detection duration and a random number. The secondary cell base station and/or the terminal choose the random number if the channel is detected busy; if the channel is detected busy in the following detection, the value of N will remain unchanged; if the channel is detected idle, N=N−1. It can be determined that data can be transmitted until the value of N is 0.

In addition, the primary cell base station can judge whether the downlink traffic reaches the first traffic threshold value or not by itself, the procedure of judging whether the uplink traffic reaches the second traffic threshold value includes: when a scheduling request and/or a buffer status report sent by the terminal are received, it is judged that whether the uplink traffic of an activated service cell of the terminal reaches the second traffic threshold value.

Meanwhile, after informing the secondary cell base station to conduct channel detection, the primary cell base station needs to send the terminal a corresponding instruction to inform the terminal to take corresponding response measures as follows.

In the above-mentioned technical solution, as one implementation, after informing the secondary cell base station to conduct downlink channel detection at the unauthorized frequency band, an activation signaling of the secondary cell base station is sent to the terminal, so that after receiving the activation signaling, the terminal can monitor a physical downlink control channel (PDCCH) of the secondary cell base station, a physical downlink shared channel (PDSCH) of the secondary cell base station, and a reference signal sent by the secondary cell base station. Besides, the terminal can measure the channel state information (CSI) of the secondary cell base station.

After informing the secondary cell base station to conduct uplink channel detection at the unauthorized frequency band, the activation signaling of the secondary cell base station is sent to the terminal, so that the terminal can send a probe reference signal after receiving the activation signaling.

In the above-mentioned technical solution, as one implementation, the procedure that the terminal is informed to conduct uplink channel detection at the unauthorized frequency band includes: it is detected that whether the downlink channel of the secondary cell base station is idle; when it is detected that the downlink channel of the secondary cell base station is idle, a downlink reference signal is sent by the secondary cell base station, and the terminal is informed to conduct uplink channel detection at the unauthorized frequency band.

In this technical solution, how to inform the terminal to conduct uplink channel detection is defined, namely, transmission is only conducted when the downlink channel of the secondary cell base station is idle, otherwise, no transmission will be conducted. In addition, the secondary cell base station can also keep sending the reference signal based on short control signaling, so that the secondary cell base station informs the terminal to conduct detection directly when the primary cell base station determines that the terminal is required to conduct uplink channel detection.

Moreover, the present disclosure also defines how to inform the terminal to conduct uplink channel detection at the unauthorized frequency band, which can include the following manners.

Manner One

The terminal is informed to conduct uplink channel detection implicitly via the activation signaling, and the terminal is informed to stop uplink channel detection implicitly via a deactivation signaling.

Manner Two

The terminal is informed to conduct uplink channel detection implicitly via UL (Uplink) grant signaling sent to the terminal.

Manner Three

New media access layer control signaling containing multiple indicator bits is defined, so as to inform the terminal to conduct uplink channel detection, wherein each indicator bit of the multiple indicator bits corresponds to one secondary cell base station, and each indicator bit is used for indicating whether the terminal needs to detect the uplink channel of the secondary cell base station corresponding to each indicator bit.

Manner Four

New physical downlink control signaling is defined to inform the terminal to conduct uplink channel detection of a specified secondary cell base station.

The defined manner in which the secondary cell base station is informed to conduct uplink channel detection and/or downlink channel detection at the unauthorized frequency band can be as follows: the secondary cell base station is informed to conduct uplink channel detection and/or downlink channel detection via an interface (such as X2 interface) between the primary cell base station and the secondary cell base station.

According to another aspect of the present disclosure, there is provided a channel detection notification apparatus when a LTE system works at an unauthorized frequency band. The apparatus includes a memory configured to store program codes and at least one processor, when executed by the at least one processor, the program codes is configured to cause the at least one processor to execute the follows:

receiving by a primary cell base station, RRM (Radio Resource Management) measuring results of multiple base stations at the unauthorized frequency band reported by a terminal;

selecting a secondary cell base station for the terminal according to the RRM measuring results of the multiple base stations;

informing the secondary cell base station to conduct downlink channel detection at the unauthorized frequency band, if it is determined that downlink traffic reaches a set first traffic threshold value; and informing the secondary cell base station and/or the terminal to conduct uplink channel detection at the unauthorized frequency band, if it is determined that uplink traffic reaches a set second traffic threshold value.

In this technical solution, the primary cell base station triggers the secondary cell base station and/or the terminal to conduct channel detections according to the size of the traffic. Therefore, the communication of the LTE system working at the unauthorized frequency band is managed by the primary cell base station uniformly, the time delay of channel detection of the secondary cell base station and/or the terminal can be effectively reduced, and the accuracy of determining the timing of channel detection can be improved, which can improve the resource utilization rate when the LTE system works at the unauthorized frequency band.

The RRM includes RSRP and RSRQ.

When the secondary cell base station and/or the terminal are informed to conduct channel detection, the manner in which the secondary cell base station and/or the terminal conduct channel detection can be specified. Specifically, the procedure of informing the secondary cell base station and/or the terminal to conduct channel detection at the unauthorized frequency band includes the following two manners.

Manner One

The secondary cell base station and/or the terminal are informed to repeat channel detection at a fixed period at the unauthorized frequency band. Namely, the secondary cell base station and/or the terminal are informed to conduct channel detection using the LBT mechanism based on frame structure.

Manner Two

The secondary cell base station and/or the terminal are informed to conduct channel detection at the unauthorized frequency band when receiving the traffic to be transmitted. Namely, the secondary cell base station and/or the terminal are informed to conduct channel detection using the LBT mechanism based on load.

In the above-mentioned technical solution, as one implementation, when executed by the at least one processor, the program codes is further configured to cause the at least one processor to execute the follows:

after choosing the secondary cell base station for the terminal and before informing the secondary cell base station and/or the terminal to conduct channel detection, sending an adding instruction of the secondary cell base station to the terminal, so that the terminal be informed that communication service is provided by the secondary cell base station.

In the above-mentioned technical solution, as one implementation, wherein if the secondary cell base station and/or the terminal are informed to repeat channel detection at the fixed period at the unauthorized frequency band, the adding instruction is configured to comprise a start time of channel detection of the secondary cell base station and/or the terminal and at least three of the following parameters: channel detection duration, channel detection period, maximum channel occupancy time, and idle time; or if the secondary cell base station and/or the terminal are informed to conduct channel detection at the unauthorized frequency band when receiving the traffic to be transmitted, the adding instruction is configured to comprise the channel detection duration and a random number; wherein the secondary cell base station and/or the terminal chooses the random number if the channel is detected busy; if the channel is detected busy in the following detection, the value of N is configured to be remain unchanged; if the channel is detected idle, N=N−1, and determines that data is transmitted until the value of N is 0.

In addition, the primary cell base station can judge whether the downlink traffic reaches the first traffic threshold value or not by itself.

In the above-mentioned technical solution, as one implementation, when executed by the at least one processor, the program codes is further configured to cause the at least one processor to execute the follows:

when a scheduling request and/or a buffer status report sent by the terminal are received, judging whether uplink traffic of an activated service cell of the terminal reaches a second traffic threshold value.

Meanwhile, after informing the secondary cell base station to conduct channel detection, the primary cell base station needs to send the terminal a corresponding instruction to inform the terminal to take corresponding response measures as follows.

In the above-mentioned technical solution, as one implementation, when executed by the at least one processor, the program codes is further configured to cause the at least one processor to execute the follows:

after informing the secondary cell base station to conduct downlink channel detection at the unauthorized frequency band, sends activation signaling of the secondary cell base station to the terminal, whereby after receiving the activation signaling, the terminal monitors a physical downlink control channel of the secondary cell base station, a physical downlink shared channel of the secondary cell base station, and a reference signal sent by the secondary cell base station and measures the channel state information of the secondary cell base station; and after informing the secondary cell base station to conduct uplink channel detection at the unauthorized frequency band, sends the activation signaling of the secondary cell base station to the terminal, whereby after receiving the activation signaling, the terminal sends a probe reference signal.

In the above-mentioned technical solution, as one implementation, when informing the terminal to conduct uplink channel detection at the unauthorized frequency band, the program codes is configured to cause the at least one processor to execute the follows:

detecting whether the downlink channel of the secondary cell base station is idle; when it is detected that the downlink channel of the secondary cell base station is idle, sending a downlink reference signal through the secondary cell base station, and informing the terminal to conduct uplink channel detection at the unauthorized frequency band.

In this technical solution, how to inform the terminal to conduct uplink channel detection is defined, namely, transmission is only conducted when the downlink channel of the secondary cell base station is idle, otherwise, no transmission will be conducted. In addition, the secondary cell base station can also keep sending the reference signal based on short control signaling, so that the secondary cell base station informs the terminal to conduct detection directly when the primary cell base station determines that the terminal is required to conduct uplink channel detection.

In the above-mentioned technical solution, as one implementation, when informing the terminal to conduct uplink channel detection at the unauthorized frequency band, the program codes is configured to cause the at least one processor to execute the follows:

informing the terminal to conduct uplink channel detection via the activation signaling implicitly, and informing the terminal to stop uplink channel detection via deactivation signaling implicitly; or informing the terminal to conduct uplink channel detection via uplink grant signaling sent to the terminal implicitly; or defining new media access layer control signaling containing multiple indicator bits, so as to inform the terminal to conduct uplink channel detection, wherein each indicator bit of the multiple indicator bits corresponds to one secondary cell base station, and each indicator bit is used for indicating whether the terminal needs to conduct uplink channel detection on the secondary cell base station corresponding to each indicator bit; or defining new physical downlink control signaling to inform the terminal to conduct uplink channel detection on a specified secondary cell base station.

In the above-mentioned technical solution, as one implementation, when informing the secondary cell base station to conduct uplink channel detection and/or downlink channel detection at the unauthorized frequency band, the program codes is configured to cause the at least one processor to execute the follows:

informing the secondary cell base station to conduct uplink channel detection and/or downlink channel detection via an interface between the primary cell base station and the secondary cell base station.

According to another aspect of the present disclosure, there is provided a base station when a LTE system works at an unauthorized frequency band as illustrated in any above-mentioned technical solutions.

By means of the above-mentioned technical solutions, channel detection is managed by the primary cell base station uniformly when the LTE system works at the unauthorized frequency band; in this way, the time delay of channel detection of a secondary cell base station and/or a terminal can be effectively reduced, and the accuracy of determining the timing of channel detection can be improved, which can improve the resource utilization rate when the LTE system works at the unauthorized frequency band.

DETAILED DESCRIPTION

Figure 1:
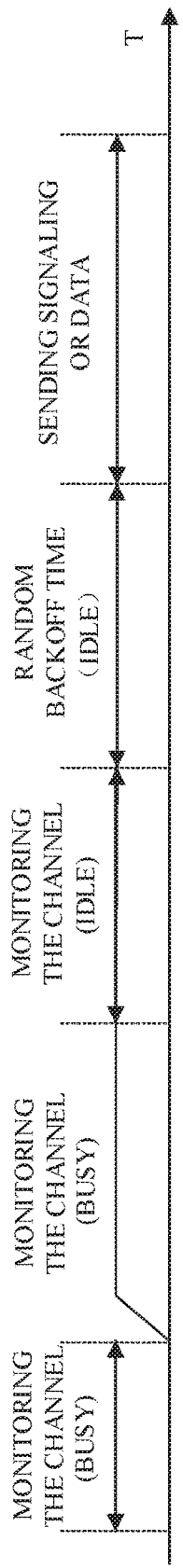
FIG. 1 is a schematic diagram illustrating an interference avoidance rule of the Wi-Fi system.

Existing access technologies used at unauthorized spectrum, such as Wi-Fi, have weak anti-jamming capability. To avoid interference, Wi-Fi system has designed multiple interference avoidance rules, such as CSMA/CD (Carrier Sense Multiple Access/Collision Detection). The basic principle of this method is that, before a terminal or an AP (Access Point) of Wi-Fi sends signaling or data, monitor and detect where other APs or terminals nearby are transmitting/receiving signaling or data. If YES, keep monitoring until no other AP or terminal transmitting/receiving signaling or data is monitored; otherwise, generate a random number as backoff time. If no signaling or data transmission is detected within the backoff time, then after the backoff time, the AP or terminal can start to send signaling or data. The procedure is illustrated in FIG. 1.

However, a LTE network has good orthogonality to ensure the interference level, therefore, uplink/downlink transmission between a base station and a user don't need to consider whether other base stations or users nearby are transmitting data. When LTE is used at the unauthorized frequency band, if it is not considered whether other devices around are using the unauthorized frequency band, it will bring great interference to Wi-Fi devices. Without any monitoring rules, LTE will transmit data as long as there is business, and therefore, it is impossible for Wi-Fi devices to transmit when LTE has business to be transmitted. Until the business transmission of LTE is finished, a channel idle state can be detected for data transmission.

It can be seen that, when the LTE network uses the unauthorized frequency band, one of the most important points is to ensure LAA can coexist with existing access technologies (such as Wi-Fi) on a fair and friendly basis. In traditional LTE systems, there is no LBT (Listen before Talk) mechanism to avoid collision. To coexist with Wi-Fi better, the LTE system needs a LBT mechanism.

LBT mechanisms mainly include a LBT mechanism based on frame structure and a LBT mechanism based on load, and the specific scheme is as follows.

Figure 2:
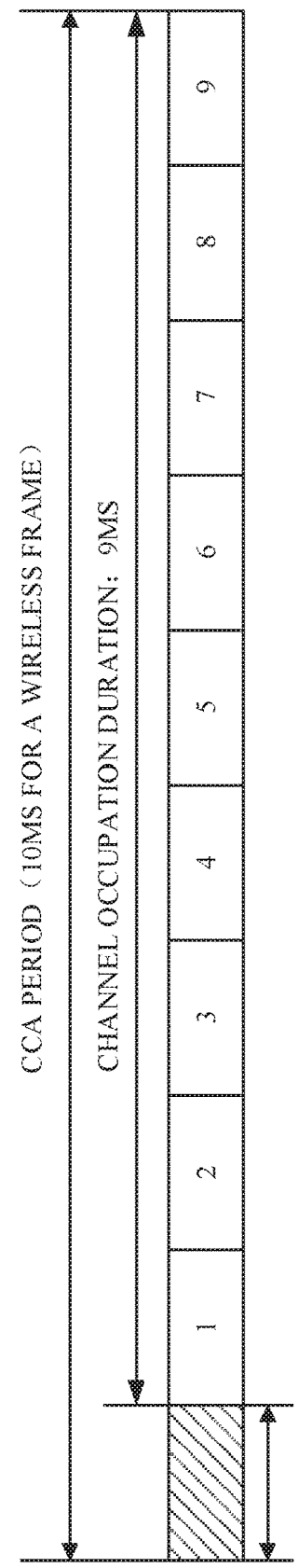
FIG. 2 is a schematic diagram illustrating a channel detection mechanism based on a frame structure.

As illustrated in FIG. 2, the LBT mechanism based on frame structure has a fixed period of LBT, and the time of CCA (Channel Clear Assessment, means the same as LBT) is the beginning of each period. In a LTE frame structure, the period is 10 ms and CCA occupies the first one or more symbols of sub-frame #0. In such a structure with fixed period, only sub frame #0 can be used for CCA. If business arrives at sub-frame#1, it must wait until CCA has been finished at sub-frame #0 of the next period, so as to judge whether a channel is available, which can result in great delay.

The main principle of the LBT mechanism based on load is that, conduct channel detection immediately when the load arrives. If the channel is detected idle, data service will be transmitted immediately; if the channel is detected busy, a number N will be selected randomly. During the following channel detection time, if the channel is detected busy, N remains unchanged; if the channel is detected idle, N is reduced by one (N−1), and when N reaches 0, data can be transmitted.

However, when the unauthorized spectrum is added as a Scell (Secondary Cell), when to start channel detection is controlled by a Pcell (Primary Cell). How to define a triggering condition and a triggering signaling procedure that the Pcell triggers the Scell or a terminal to conduct channel detection at the unauthorized spectrum, become a technical problem need to be solved urgently.

In order to understand the above-mentioned purposes, features and advantages of the present disclosure more clearly, a further detailed description of the present disclosure is given below in combination with the accompanying drawings and specific implementations. It should be noted that, the implementations and features of the implementations of this application can be combined when there is no conflict.

In the following description, numerous specific details are set forth in order to facilitate a thorough understanding of the present disclosure, however, the present disclosure can be practiced otherwise than as specifically described herein, and therefore, the scope of the present disclosure is not to be limited by the specific implementations disclosed below.

Figure 3:
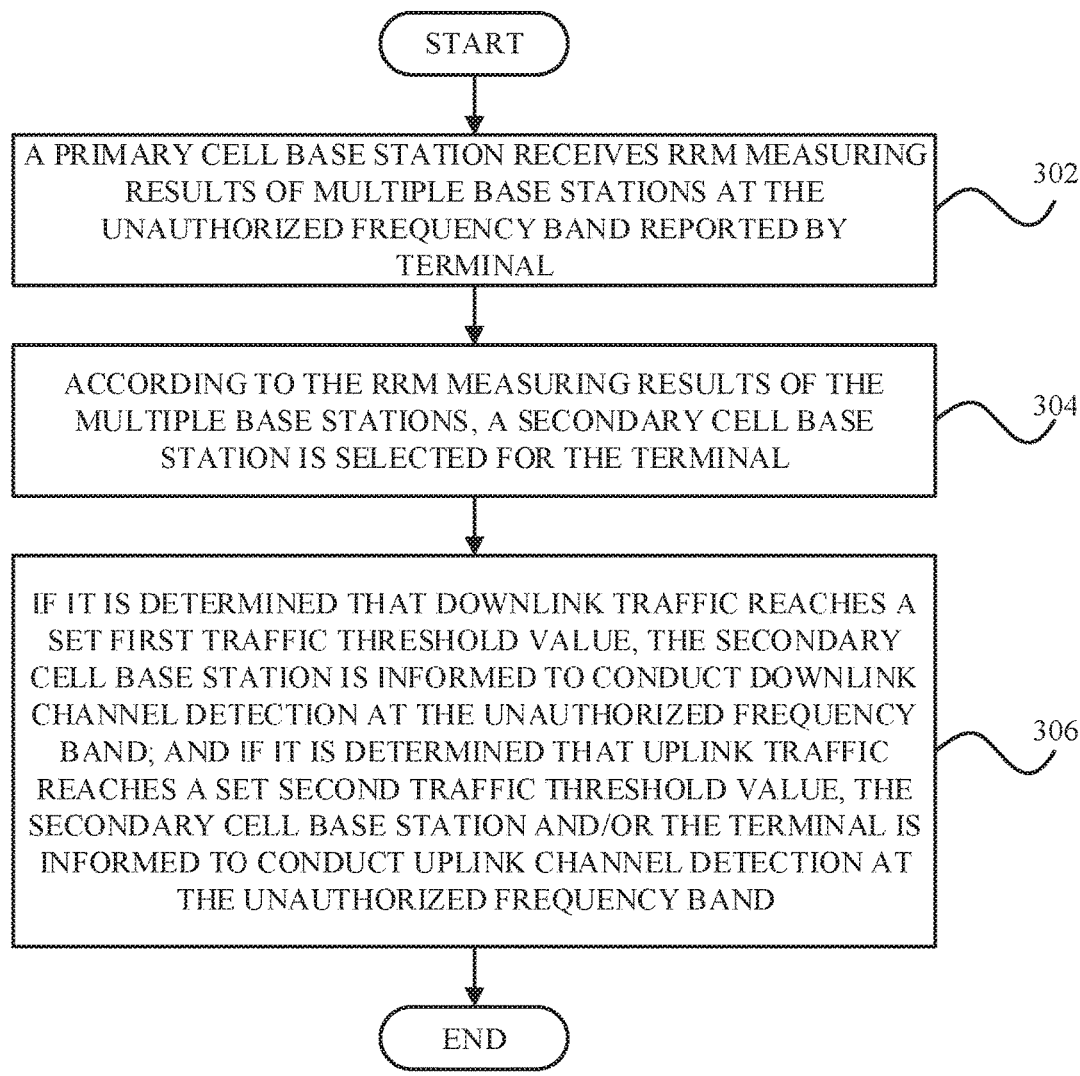
FIG. 3 is a schematic flowchart illustrating a channel detection notification method applicable to base stations when a LTE system works at an unauthorized frequency band according to an implementation of the present disclosure.

FIG. 3 is a schematic flowchart illustrating a channel detection notification method applicable to base stations when a LTE system works at an unauthorized frequency band according to one implementation of the present disclosure.

As illustrated in FIG. 3, the channel detection notification method applicable to base stations when a LTE system works at an unauthorized frequency band according to one implementation of the present disclosure includes the follows. Step 302, a primary cell base station receives RRM measuring results of multiple base stations at the unauthorized frequency band reported by terminal; Step 304, according to the RRM measuring results of the multiple base stations, a secondary cell base station is selected for the terminal; Step 306, if it is determined that downlink traffic reaches a set first traffic threshold value, the secondary cell base station is informed to conduct downlink channel detection at the unauthorized frequency band; and if it is determined that uplink traffic reaches a set second traffic threshold value, the secondary cell base station and/or the terminal is informed to conduct uplink channel detection at the unauthorized frequency band.

In this technical solution, the primary cell base station triggers the secondary cell base station and/or the terminal to conduct channel detections according to the size of the traffic. Therefore, the communication of the LTE system working at the unauthorized frequency band is managed by the primary cell base station uniformly, the time delay of channel detection of the secondary cell base station and/or the terminal can be effectively reduced, and the accuracy of determining the timing of channel detection can be improved, which can improve the resource utilization rate when the LTE system works at the unauthorized frequency band.

The RRM includes RSRP (Reference Signal Receiving Power) and RSRQ (Reference Signal Receiving Quality).

When the secondary cell base station and/or the terminal are informed to conduct channel detection, the manner in which the secondary cell base station and/or the terminal conduct channel detection can be specified. Specifically, the procedure of informing the secondary cell base station and/or the terminal to conduct channel detection at the unauthorized frequency band includes the following two manners.

Manner One

The secondary cell base station and/or the terminal are informed to repeat channel detection at a fixed period at the unauthorized frequency band. Namely, the secondary cell base station and/or the terminal are informed to conduct channel detection using the LBT mechanism based on frame structure.

Manner Two

The secondary cell base station and/or the terminal are informed to conduct channel detection at the unauthorized frequency band when receiving the traffic to be transmitted. Namely, the secondary cell base station and/or the terminal are informed to conduct channel detection using the LBT mechanism based on load.

In the above-mentioned technical solution, as one implementation, after choosing the secondary cell base station for the terminal, and before informing the secondary cell base station and/or the terminal to conduct channel detection, the method further includes: an adding instruction of the secondary cell base station is sent to the terminal, so that the terminal can be informed that communication service is provided by the secondary cell base station.

In the above-mentioned technical solution, as one implementation, if the secondary cell base station and/or the terminal are informed to repeat channel detection at a fixed period at the unauthorized frequency band, the adding instruction includes a start time of channel detection of the secondary cell base station and/or the terminal and at least three of the following parameters: channel detection duration, channel detection period, maximum channel occupancy time, and idle time. If the secondary cell base station and/or the terminal are informed to conduct channel detection at the unauthorized frequency band when receiving the traffic to be transmitted, the adding instruction includes the channel detection duration and a random number. The secondary cell base station and/or the terminal choose the random number if the channel is detected busy; if the channel is detected busy in the following detection, the value of N will remain unchanged; if the channel is detected idle, N=N−1. It can be determined that data can be transmitted until the value of N is 0.

In addition, the primary cell base station can judge whether the downlink traffic reaches the first traffic threshold value or not by itself, the procedure of judging whether the uplink traffic reaches the second traffic threshold value includes: when a scheduling request and/or a buffer status report sent by the terminal are received, it is judged that whether the uplink traffic of an activated service cell of the terminal reaches the second traffic threshold value.

Meanwhile, after informing the secondary cell base station to conduct channel detection, the primary cell base station needs to send the terminal a corresponding instruction to inform the terminal to take corresponding response measures as follows.

In the above-mentioned technical solution, as one implementation, after informing the secondary cell base station to conduct downlink channel detection at the unauthorized frequency band, an activation signaling of the secondary cell base station is sent to the terminal, so that after receiving the activation signaling, the terminal can monitor a physical downlink control channel (PDCCH) of the secondary cell base station, a physical downlink shared channel (PDSCH) of the secondary cell base station, and a reference signal sent by the secondary cell base station. Besides, the terminal can measure the channel state information (CSI) of the secondary cell base station.

After informing the secondary cell base station to conduct uplink channel detection at the unauthorized frequency band, the activation signaling of the secondary cell base station is sent to the terminal, so that after receiving the activation signaling, the terminal can send a probe reference signal.

In the above-mentioned technical solution, as one implementation, the procedure that the terminal is informed to conduct uplink channel detection at the unauthorized frequency band includes: it is detected that whether the downlink channel of the secondary cell base station is idle; when it is detected that the downlink channel of the secondary cell base station is idle, a downlink reference signal is sent by the secondary cell base station, and the terminal is informed to conduct uplink channel detection at the unauthorized frequency band.

In this technical solution, how to inform the terminal to conduct uplink channel detection is defined, namely, transmission is only conducted when the downlink channel of the secondary cell base station is idle, otherwise, no transmission will be conducted. In addition, the secondary cell base station can also keep sending the reference signal based on short control signaling, so that the secondary cell base station informs the terminal to conduct detection directly when the primary cell base station determines that the terminal is required to conduct uplink channel detection.

Moreover, the present disclosure also defines how to inform the terminal to conduct uplink channel detection at the unauthorized frequency band, which can include the following manners.

Manner One

The terminal is informed to conduct uplink channel detection implicitly via the activation signaling, and the terminal is informed to stop uplink channel detection implicitly via a deactivation signaling.

Manner Two

The terminal is informed to conduct uplink channel detection implicitly via UL (Uplink) grant signaling sent to the terminal.

Manner Three

New media access layer control signaling containing multiple indicator bits is defined, so as to inform the terminal to conduct uplink channel detection, wherein each indicator bit of the multiple indicator bits corresponds to one secondary cell base station, and each indicator bit is used for indicating whether the terminal needs to detect the uplink channel of the secondary cell base station corresponding to each indicator bit.

Manner Four

New physical downlink control signaling is defined to inform the terminal to conduct uplink channel detection of a specified secondary cell base station.

The defined manner in which the secondary cell base station is informed to conduct uplink channel detection and/or downlink channel detection at the unauthorized frequency band can be as follows: the secondary cell base station is informed to conduct uplink channel detection and/or downlink channel detection via an interface (such as X2 interface) between the primary cell base station and the secondary cell base station.

Figure 4:
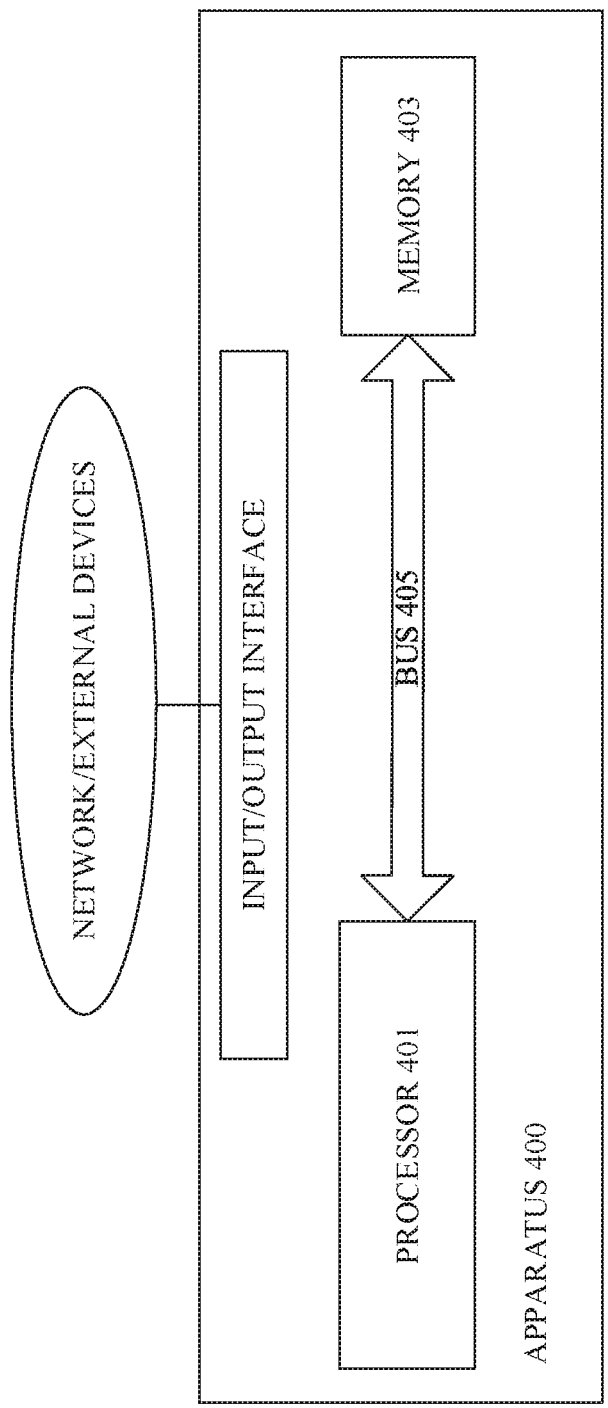
FIG. 4 is a schematic block diagram illustrating a channel detection notification apparatus applicable to base stations when a LTE system works at an unauthorized frequency band according to an implementation of the present disclosure.
Figure 5:
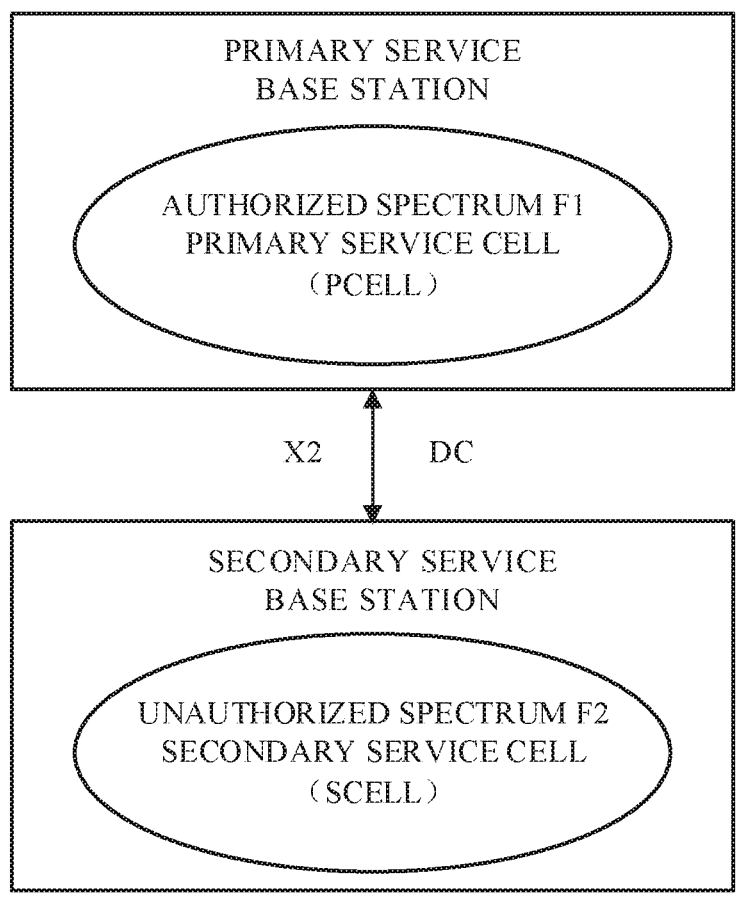
FIG. 5 is a schematic diagram illustrating a connection relationship between a primary service base station and a secondary service base station according to an implementation of the present disclosure.

As illustrated in FIG. 4, the apparatus 400 can include a processor 401. As an implementation, the processor 401 can be connected with a memory 403 built in the apparatus 400 via a bus 405. The memory can be configured to store one or more program codes, when executed by the processor 401, adapted to cause the processor 401 to perform the steps of the channel detection notification method illustrated above with reference to the accompanying drawings. The apparatus 400 can communicate with external devices or access a network via an input/output interface arranged therein.

In this technical solution, the primary cell base station triggers the secondary cell base station and/or the terminal to conduct channel detections according to the size of the traffic. Therefore, the communication of the LTE system working at the unauthorized frequency band is managed by the primary cell base station uniformly, the time delay of channel detection of the secondary cell base station and/or the terminal can be effectively reduced, and the accuracy of determining the timing of channel detection can be improved, which can improve the resource utilization rate when the LTE system works at the unauthorized frequency band.

The RRM includes RSRP and RSRQ.

When the secondary cell base station and/or the terminal are informed to conduct channel detection, the manner in which the secondary cell base station and/or the terminal conduct channel detection can be specified. Specifically, the procedure of informing the secondary cell base station and/or the terminal to conduct channel detection at the unauthorized frequency band includes the following two manners.

Manner One

The secondary cell base station and/or the terminal are informed to repeat channel detection at a fixed period at the unauthorized frequency band. Namely, the secondary cell base station and/or the terminal are informed to conduct channel detection using the LBT mechanism based on frame structure.

Manner Two

The secondary cell base station and/or the terminal are informed to conduct channel detection at the unauthorized frequency band when receiving the traffic to be transmitted. Namely, the secondary cell base station and/or the terminal are informed to conduct channel detection using the LBT mechanism based on load.

In the above-mentioned technical solution, as one implementation, when executed by the processor 401, the program codes are further configured to cause the processor 401 to execute the follows:

after choosing the secondary cell base station for the terminal and before informing the secondary cell base station and/or the terminal to conduct channel detection, sending an adding instruction of the secondary cell base station to the terminal, so that the terminal be informed that communication service is provided by the secondary cell base station.

In the above-mentioned technical solution, as one implementation, wherein if the secondary cell base station and/or the terminal are informed to repeat channel detection at the fixed period at the unauthorized frequency band, the adding instruction is configured to comprise a start time of channel detection of the secondary cell base station and/or the terminal and at least three of the following parameters: channel detection duration, channel detection period, maximum channel occupancy time, and idle time; or if the secondary cell base station and/or the terminal are informed to conduct channel detection at the unauthorized frequency band when receiving the traffic to be transmitted, the adding instruction is configured to comprise the channel detection duration and a random number; wherein the secondary cell base station and/or the terminal chooses the random number if the channel is detected busy; if the channel is detected busy in the following detection, the value of N is configured to be remain unchanged; if the channel is detected idle, N=N−1, and determines that data is transmitted until the value of N is 0.

In addition, the primary cell base station can judge whether the downlink traffic reaches the first traffic threshold value or not by itself.

In the above-mentioned technical solution, as one implementation, when executed by the processor 401, the program codes is further configured to cause the processor 401 to execute the follows:

when a scheduling request and/or a buffer status report sent by the terminal are received, judging whether uplink traffic of an activated service cell of the terminal reaches a second traffic threshold value.

Meanwhile, after informing the secondary cell base station to conduct channel detection, the primary cell base station needs to send the terminal a corresponding instruction to inform the terminal to take corresponding response measures as follows.

In the above-mentioned technical solution, as one implementation, when executed by the processor 401, the program codes is further configured to cause the processor 401 to execute the follows:

after informing the secondary cell base station to conduct downlink channel detection at the unauthorized frequency band, sends activation signaling of the secondary cell base station to the terminal, whereby after receiving the activation signaling, the terminal monitors a physical downlink control channel of the secondary cell base station, a physical downlink shared channel of the secondary cell base station, and a reference signal sent by the secondary cell base station and measures the channel state information of the secondary cell base station; and after informing the secondary cell base station to conduct uplink channel detection at the unauthorized frequency band, sends the activation signaling of the secondary cell base station to the terminal, whereby after receiving the activation signaling, the terminal sends a probe reference signal.

In the above-mentioned technical solution, as one implementation, when informing the terminal to conduct uplink channel detection at the unauthorized frequency band, the program codes is configured to cause the processor 401 to execute the follows:

detecting whether the downlink channel of the secondary cell base station is idle; when it is detected that the downlink channel of the secondary cell base station is idle, sending a downlink reference signal through the secondary cell base station, and informing the terminal to conduct uplink channel detection at the unauthorized frequency band.

In this technical solution, how to inform the terminal to conduct uplink channel detection is defined, namely, transmission is only conducted when the downlink channel of the secondary cell base station is idle, otherwise, no transmission will be conducted. In addition, the secondary cell base station can also keep sending the reference signal based on short control signaling, so that the secondary cell base station informs the terminal to conduct detection directly when the primary cell base station determines that the terminal is required to conduct uplink channel detection.

In the above-mentioned technical solution, as one implementation, when informing the terminal to conduct uplink channel detection at the unauthorized frequency band, the program codes is configured to cause the processor 401 to execute the follows:

informing the terminal to conduct uplink channel detection via the activation signaling implicitly, and informing the terminal to stop uplink channel detection via deactivation signaling implicitly; or informing the terminal to conduct uplink channel detection via uplink grant signaling sent to the terminal implicitly; or defining new media access layer control signaling containing multiple indicator bits, so as to inform the terminal to conduct uplink channel detection, wherein each indicator bit of the multiple indicator bits corresponds to one secondary cell base station, and each indicator bit is used for indicating whether the terminal needs to conduct uplink channel detection on the secondary cell base station corresponding to each indicator bit; or defining new physical downlink control signaling to inform the terminal to conduct uplink channel detection on a specified secondary cell base station.

The present disclosure further provides a base station (not illustrated), which includes channel detection notification apparatus 400 when a LTE system works at an unauthorized frequency band as illustrated in FIG. 4.

Detailed descriptions of technical solutions of the present disclosure are provided below in combination with FIG. 5 to FIG. 8.

The present disclosure mainly aims at triggering conditions and triggering signaling procedures of channel detection at the unauthorized spectrum, and provides channel detection methods controlled by a primary service base station (namely the above-mentioned primary cell base station) based on following three cases.

Case one: a secondary service base station (namely the above-mentioned secondary cell base station) conducts downlink channel detection;

Case two: the secondary service base station conducts uplink channel detection;

Case three: the terminal conducts uplink channel detection.

The above three cases further include a LBT mechanism of frame based equipment (FBE) and a LBT mechanism of load based equipment (LBE) respectively. The above-mentioned three cases are described respectively in detail below.

Case one, the secondary service base station conducts downlink channel detection:

The terminal conducts RRM measurement and reports RRM measuring results at the unauthorized spectrum under the control of a Pcell (Primary cell). According to the RRM measuring results at the unauthorized spectrum of the terminal, a primary eNB (PeNB) sends RRC (Radio Resource Control) signaling to the terminal, in order to add a cell which has larger RSRP/RSRQ at the unauthorized spectrum to be a Scell (Secondary cell) of the terminal.

In this case, the following points can be followed.

1. If LBT mechanism used by the secondary service base station at the unauthorized spectrum is FBE based, when sends a Scell-adding instruction to the terminal via RRC signaling, the RRC signaling needs to contain channel detection start time, CCA detection duration, CCA detection time period, maximum channel occupancy time, and idle time of the FBE based LBT mechanism of the Scell. If the secondary service base station uses the LBE based LBT mechanism, when sends the Scell-adding instruction to the terminal via the RRC signaling, the RRC signaling needs to contain the CCA detection duration, the value of N of CCA (namely, "N" in the above-mentioned technical solutions), maximum channel occupancy time, and idle time of the LBE based LBT mechanism of the Scell.

2. The primary service base station determines whether the downlink business is too much. If the downlink business is too much and the unauthorized spectrum resource is available, the primary service base station starts channel detection at the unauthorized spectrum. Before the terminal adds the Scell, it is possible that other terminals have been served by the Scell, therefore, the primary service base station has started channel detection at the unauthorized spectrum already; it is also possible that the terminal is the first terminal to add the Scell, in this case, the primary service base station needs to inform the secondary service base station to start channel detection at the unauthorized spectrum. If the terminal, the primary service base station, and the base station that the Scell belongs to (namely the secondary service base station) are in a double connection relationship, the primary service base station needs to inform the base station that the Scell belongs to, to start channel detection at the unauthorized spectrum via an interface (such as X2 interface) between base stations.

3. After starting channel detection at the unauthorized spectrum, the secondary service base station sends Scell activation signaling (MAC signaling) to the terminal. After receiving the Scell activation signaling, the terminal starts to monitor PDCCH (if any) and PDSCH of the Scell, measure CSI, and monitor reference signals and the like.

Case two, the secondary service base station conducts uplink channel detection.

The terminal conducts RRM measurement and reports RRM measuring results at the unauthorized spectrum under control of the Pcell. According to the RRM measuring results at the unauthorized spectrum of the terminal, a PeNB sends RRC signaling to the terminal, in order to add a cell which has larger RSRP/RSRQ at the unauthorized spectrum to be a Scell of the terminal.

In this case, the following points can be included as followed:

1. If the LBT mechanism used by the secondary service base station at the unauthorized spectrum is FBE based, when sends a Scell-adding instruction to the terminal via the RRC signaling, the RRC signaling needs to include channel detection start time, CCA detection duration, CCA detection period, maximum channel occupancy time, and idle time of the FBE based LBT mechanism of the Scell. If the secondary service base station conducts LBT mechanism for LBE, RRC signaling needs to, when sends Scell-adding instruction to the terminal, include CCA duration, the value of N of CCA (namely the N of above-mentioned technical solutions), maximum channel occupancy time and idle time of LBT mechanism for LBE of the Scell.

2. When uplink business arrives at the terminal, a scheduling request and/or a buffer status report are sent to a service cell deployed with PUCCH (physical uplink control channel).

3. After the service cell deployed with PUCCH receives the scheduling request and/or the buffer status report, if the service cell believes that the uplink business is too much, it will determine whether uplink channel detection at the unauthorized spectrum is triggered. If NO, uplink channel detection will be triggered immediately. If the terminal, the primary service base station, and the base station that the Scell belongs to are in a double connection relationship, the primary service base station needs to inform the base station that the Scell belongs to, to start channel detection at the unauthorized spectrum via an interface (such as X2 interface) between base stations specifically as illustrated as FIG. 5.

4. After starting channel detection at the unauthorized spectrum, the secondary service base station sends Scell activation signaling (MAC signaling) to the terminal. After receiving the Scell activation signaling, the terminal starts to send sounding reference signals and the like via the Scell.

Figure 6:
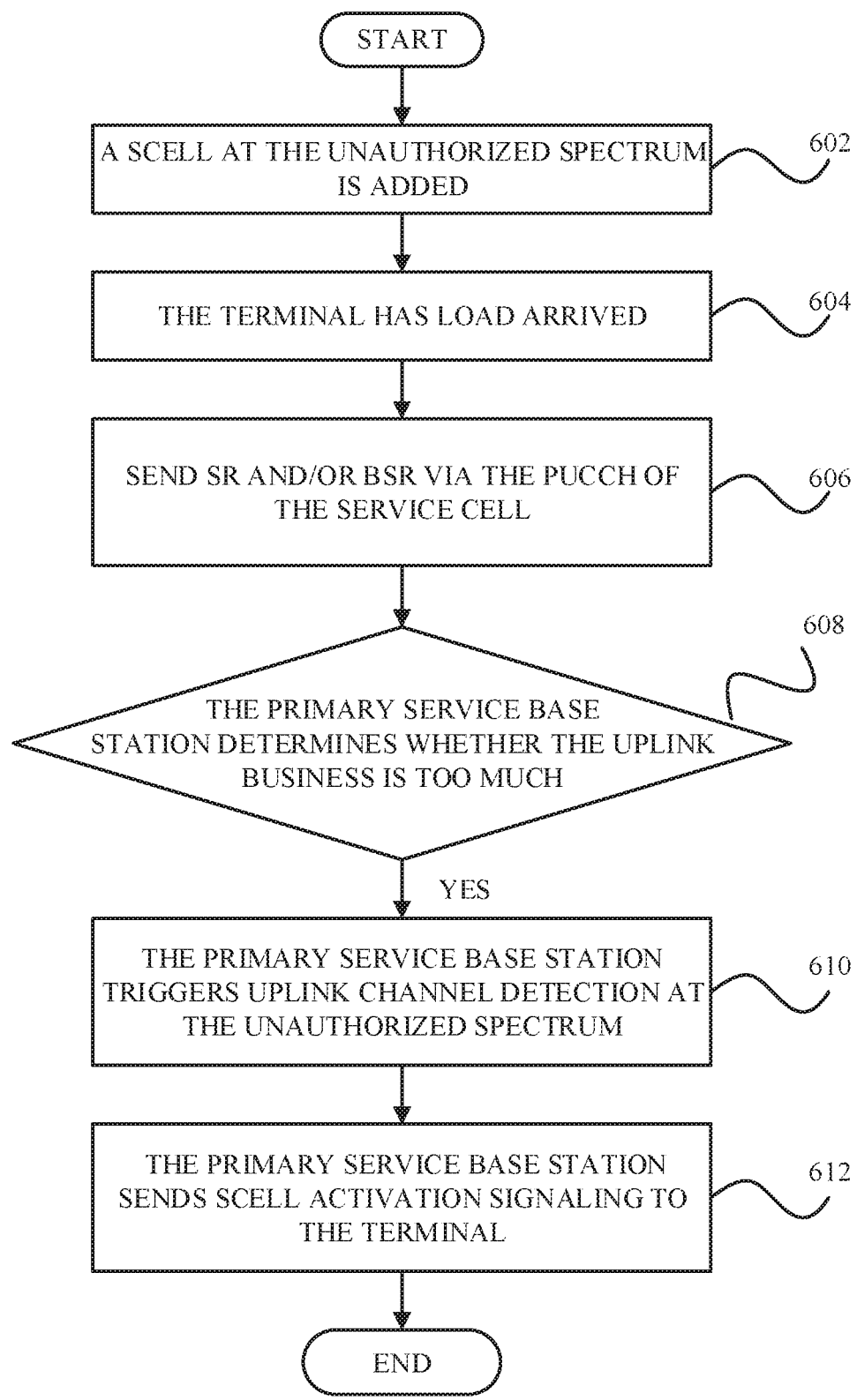
FIG. 6 is a schematic flowchart illustrating a channel detection method according to an implementation of the present disclosure.

A processing flowchart in this case is illustrated in FIG. 6.

As illustrated in FIG. 6, a channel detection method according to an implementation of the present disclosure includes:

Step 602, a service cell (Scell) at the unauthorized spectrum is added to the terminal.

Step 604, the terminal has load arrived, namely the terminal has business to be processed.

Step 606, the terminal sends SR (scheduling request) and/or BSR (buffer status report) via the PUCCH of the service cell.

Step 608, the primary service base station determines whether the uplink business is too much, if YES, proceeds to step 610.

Step 610, the primary service base station triggers uplink channel detection at the unauthorized spectrum.

Step 612, the primary service base station sends the Scell activation signaling to the terminal.

Figure 7:
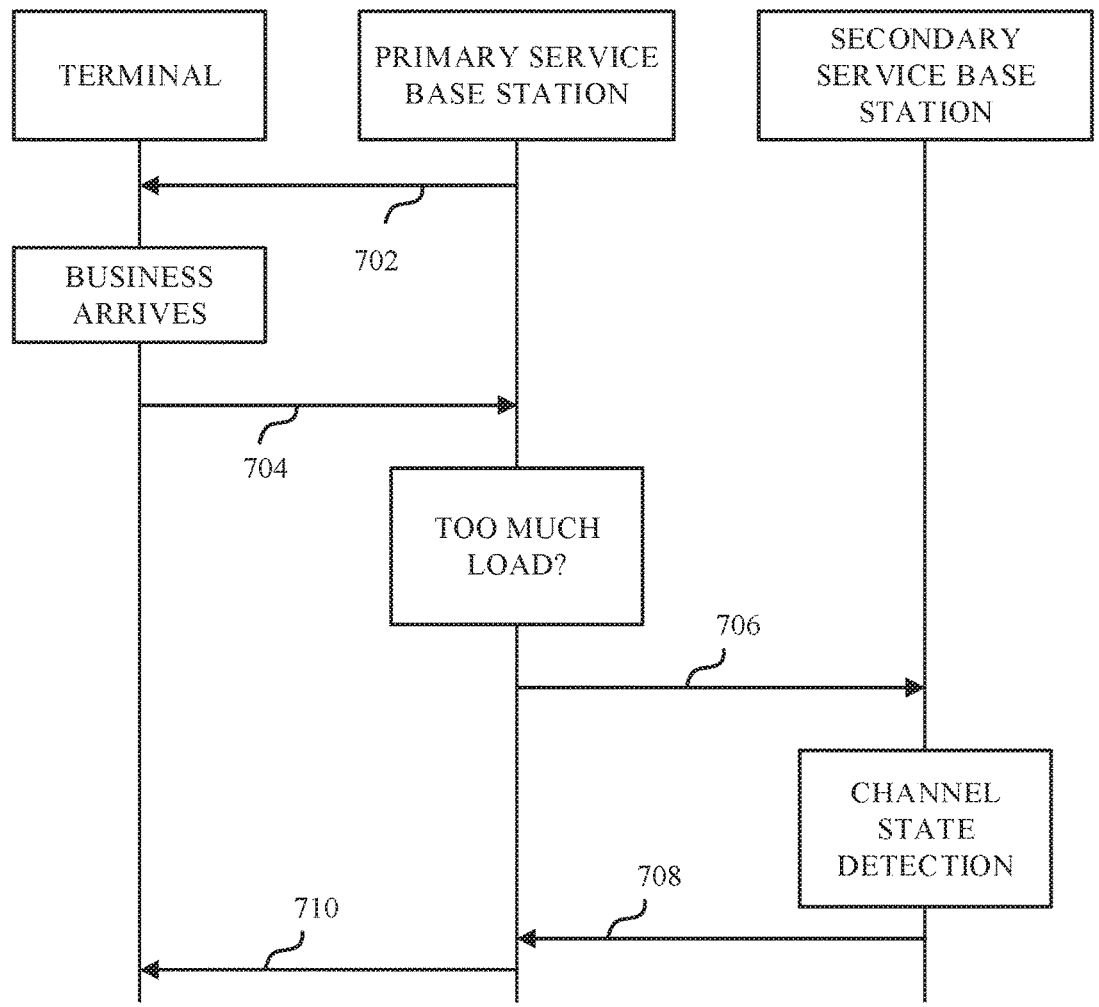
FIG. 7 is a schematic flowchart illustrating a channel detection method according to another implementation of the present disclosure.

Another processing flowchart in this case is illustrated in FIG. 7.

As illustrated in FIG. 7, a channel detection method according to another implementation of the present disclosure includes:

Step 702, a service cell (Scell) at the unauthorized spectrum is added to the terminal.

Step 704, when business arrives, the terminal sends SR (scheduling request) and/or BSR (buffer status report) via the PUCCH of the service cell.

Step 706, the primary service base station determines whether the uplink business is too much, if YES, triggers the secondary service base station to conduct uplink channel detection at the unauthorized spectrum.

Step 708, the secondary service base station starts channel state detection.

Step 710, the primary service base station sends activation signaling of the Scell to the terminal.

Case three, the terminal conducts uplink channel detection.

The terminal conducts RRM measurement and reports RRM measuring results at the unauthorized spectrum under the control of the Pcell (Primary cell). According to the RRM measuring results at the unauthorized spectrum of the terminal, a PeNB sends RRC signaling to the terminal, in order to add a cell which has larger RSRP/RSRQ at the unauthorized spectrum to be a Scell of the terminal.

In this case, the following points can be followed:

1. If the LBT mechanism used by the terminal at the unauthorized spectrum is FBE based, when sends a Scell-adding instruction to the terminal via RRC signaling, the RRC signaling needs to include channel detection start time, CCA detection duration, CCA detection time period, maximum channel occupancy time, and idle time of the FBE based LBT mechanism of the terminal. If the terminal uses the LBT mechanism based on LBE, when sends the Scell-adding instruction to the terminal via the RRC signaling, the RRC singling needs to include the CCA detection duration, the value of N of CCA (namely, "N" in above-mentioned technical solutions), maximum channel occupancy time, and idle time of the LBE based LBT mechanism of the terminal.

2. When uplink business arrives the terminal, the scheduling request and/or the buffer status report are sent to a service cell deployed with PUCCH (physical uplink control channel).

3. After the service cell deployed with PUCCH receives the scheduling request and/or the buffer status report, if the service cell believes that the uplink business is too much, it will send uplink channel detection triggering signaling to the terminal. The design scheme of the signaling can be in the following manners.

Manner One

Scell activation signaling is multiplexed to implicitly instruct uplink channel detection is needed. Besides, Scell deactivation signaling is used to implicitly instruct to stop uplink channel detection.

Manner Two

UL grant signaling is multiplexed, the UL grant signaling allocates uplink resources at the unauthorized spectrum to the terminal directly via cross carrier scheduling, in order to implicitly instruct that uplink channel detection is needed.

Manner Three

Design new signaling, specifically, as follows.

For the FBE based LBT mechanism, new MAC signaling can be defined, that is, similar to the Scell activation signaling, each Scell corresponds to one bit; the bit is 1 and is configured to indicate to trigger uplink channel detection. Besides, multiple Scells can be triggered at the same time.

For the LBE based LBT mechanism, new DCI signaling of PDCCH can be defined. Similar to cross carrier scheduling, the new DCI signaling of PDCCH is configured to instruct a Scell to trigger uplink channel detection, and only one Scell can be triggered one time. Base stations can choose the time for the terminal to conduct uplink channel detection according to specific situations. For instance, the time when the Scell has no downlink business and/or the time when other terminals in the Scell have no uplink business and the like can be chosen, so as to avoid misjudgment.

4. After receiving uplink channel detection triggering signaling, the terminal starts to monitor uplink channel at the arriving CCA detection time if the LBT mechanism is FBE based; if the LBT mechanism is LBE based, the terminal conducts uplink channel detection immediately.

5. Before sending the uplink channel detection triggering signaling to the terminal, the base station need to determine the follows.

If the downlink reference signal is based on short control signaling, it is not necessary to wait for the channel to be idle.

If the downlink reference signal is only to be sent when the channel is available, in this condition, the base station needs to determine whether the downlink channel of the base station is available and whether the downlink reference signal is being sent currently. If the base station detects that the channel is busy and therefore cannot be used to send the downlink reference signal, the base station will not send the uplink channel detection triggering signaling to the terminal. Because the downlink reference signal is used for downlink time-frequency synchronization of the terminal, the terminal cannot acquire uplink sending time until time and frequency are synchronized. Therefore, in this situation, it is equivalent to only when the base station detects that the current downlink channel is available, the uplink channel detection triggering signaling can be sent to the terminal. In other words, only when both the uplink channel and the downlink channel are available, the uplink transmission can be conducted.

Figure 8:
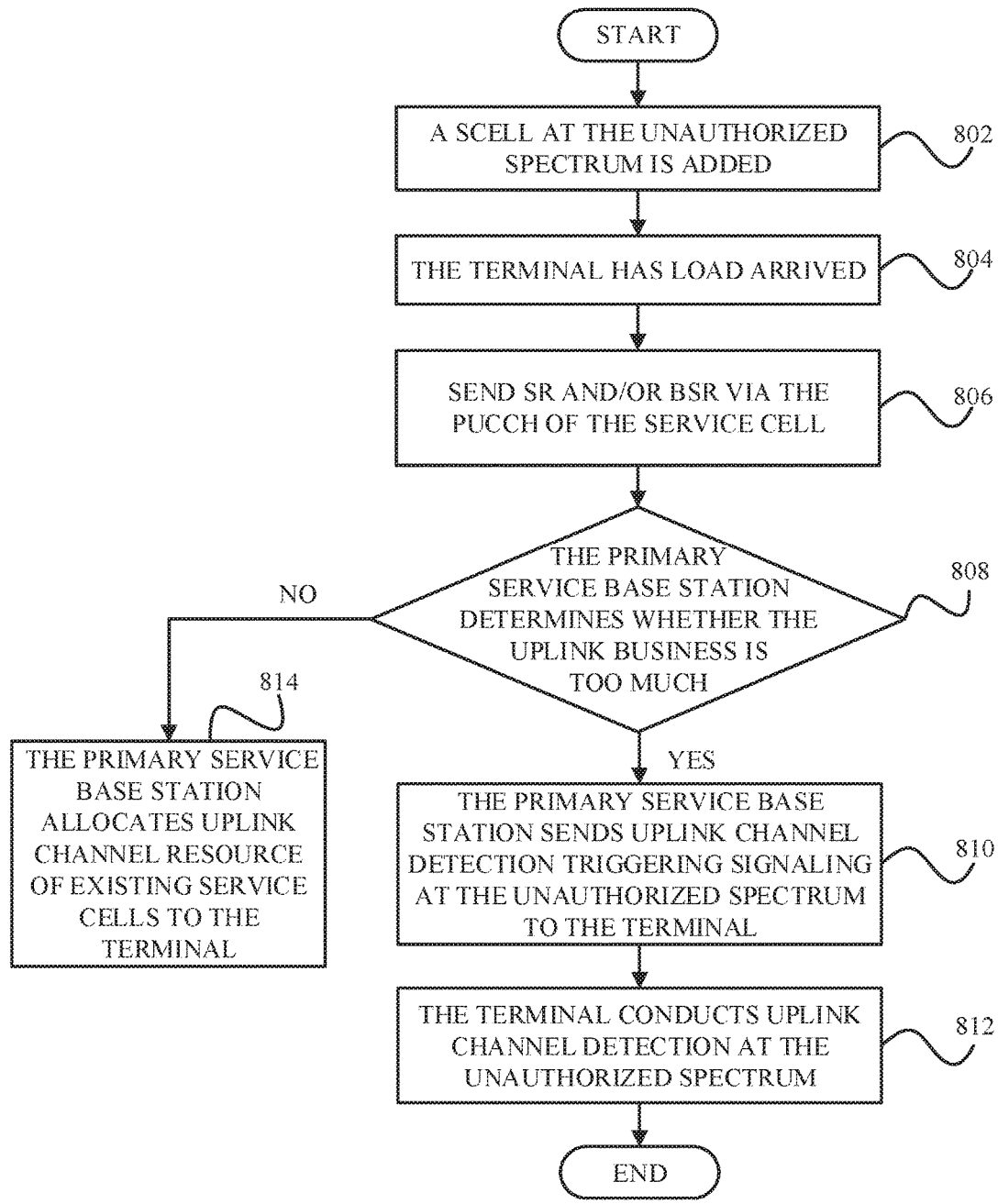
FIG. 8 is a schematic flowchart illustrating a channel detection method according to a further implementation of the present disclosure.

A processing flowchart in this case is illustrated in FIG. 8.

As illustrated in FIG. 8, a channel detection method according to a further implementation of the present disclosure includes:

Step 802, a Scell at the unauthorized spectrum is added to the terminal.

Step 804, the terminal has load arrived, namely the terminal has business to be processed.

Step 806, the terminal sends a SR (scheduling request) and/or BSR (buffer status report) via the PUCCH of the service cell.

Step 808, the primary service base station determines whether the uplink business is too much, if YES, proceeds to Step 810; otherwise, proceeds to Step 814.

Step 810, the primary service base station sends the uplink channel detection triggering signaling at the unauthorized spectrum to the terminal.

Step 812, the terminal conducts uplink channel detection at the unauthorized spectrum.

Step 814, the primary service base station allocates uplink channel resources of existing service cells to the terminal.

The above-mentioned technical solutions of the present disclosure mainly design the condition and the triggering signaling procedure of triggering channel detection controlled by the primary service base station. Through the method and the signaling procedure provided by the present disclosure, communication of a LTE system at the unauthorized spectrum is controlled by base stations. Besides, misjudgment and time delay can be reduced, and the resource utilization rate at the unauthorized spectrum can be further improved.

The technical solutions of the present disclosure have been described above with reference to the accompanying drawings. The present disclosure proposes a new channel detection notification scheme when a LTE system works at an unauthorized frequency band, so that when the LTE system works at the unauthorized frequency band, channel detection is managed by a primary cell base station uniformly; in this way, the time delay of channel detection of a secondary cell base station and/or a terminal can be effectively reduced, and the accuracy of determining the timing of channel detection can be improved, and this can improve the resource utilization rate when the LTE system works at the unauthorized frequency band.

The above-mentioned are only example implementations of the present disclosure, therefore, the scope of the present disclosure is not limited thereto. As will occur to those skilled in the art, the present disclosure is susceptible to various modifications and changes. Any modifications, equivalent replacements or improvements without departing from the spirit and principle of the present disclosure, shall fall within the scope of the present disclosure.

What is claimed is:

1. A method for channel detection notification for a base station, comprising:
   when a LTE system works at an unauthorized frequency band, receiving, by a primary cell base station, Radio Resource Management (RRM) measuring results of multiple base stations at the unauthorized frequency band reported by a terminal;
   selecting a secondary cell base station for the terminal according to the RRM measuring results of the multiple base stations;
   informing the secondary cell base station to conduct downlink channel detection at the unauthorized frequency band, when it is determined that downlink traffic reaches a set first traffic threshold value; and
   informing at least one of the secondary cell base station and the terminal to conduct uplink channel detection at the unauthorized frequency band, when it is determined that uplink traffic reaches a set second traffic threshold value.

2. The method of claim 1, wherein informing at least one of the secondary cell base station and the terminal to conduct the uplink channel detection at the unauthorized frequency band comprises:
   informing at least one of the secondary cell base station and the terminal to repeat channel detection at a fixed period at the unauthorized frequency band; or informing at least one of the secondary cell base station and the terminal to repeat the channel detection at the unauthorized frequency band when receiving traffic to be transmitted.

3. The method of claim 2, further comprising:

after choosing the secondary cell base station for the terminal and prior to informing at least one of the secondary cell base station and the terminal to conduct the channel detection, sending an adding instruction of the secondary cell base station to the terminal, wherein the terminal is informed that communication service is provided by the secondary cell base station.

4. The method of claim 3, wherein when at least one of the secondary cell base station and the terminal are informed to repeat the channel detection at the fixed period at the unauthorized frequency band, the adding instruction comprises a start time of the channel detection of at least one of the secondary cell base station and the terminal, and at least three of the following parameters: a channel detection duration, a channel detection period, a maximum channel occupancy time, and an idle time; or when at least one of the secondary cell base station and the terminal is informed to conduct the channel detection at the unauthorized frequency band when receiving the traffic to be transmitted, the adding instruction comprises the channel detection duration and a random number wherein at least one of the secondary cell base station and the terminal chooses the random number when the channel is detected busy, when the channel is detected busy in the following detection, the value of the random number is configured to be remain unchanged, and when the channel is detected idle, the value of the random number is decreased by 1 and transmitted until the value of the random number is 0.

5. The method of claim 2, wherein informing the secondary cell base station to conduct at least one of the uplink channel detection and the downlink channel detection at the unauthorized frequency band comprises:

informing the secondary cell base station to conduct at least one of the uplink channel detection and the downlink channel detection via an interface between the primary cell base station and the secondary cell base station.

6. The method of claim 1, further comprising:

when at least one of a scheduling request and a buffer status report sent by the terminal are received, determining whether uplink traffic of an activated service cell of the terminal reaches a second traffic threshold value.

7. The method of claim 1, further comprising:

after informing the secondary cell base station to conduct the downlink channel detection at the unauthorized frequency band, sending activation signaling of the secondary cell base station to the terminal, wherein after receiving the activation signaling, the terminal monitors a physical downlink control channel of the secondary cell base station, a physical downlink shared channel of the secondary cell base station, and a reference signal sent by the secondary cell base station, and measures channel state information of the secondary cell base station; and after informing the secondary cell base station to conduct the uplink channel detection at the unauthorized frequency band, sending the activation signaling of the secondary cell base station to the terminal, wherein after receiving the activation signaling, the terminal sends a probe reference signal.

8. The method of claim 1, wherein informing the terminal to conduct the uplink channel detection at the unauthorized frequency band comprises:

detecting whether the downlink channel of the secondary cell base station is idle; and when it is detected that the downlink channel of the secondary cell base station is idle, sending a downlink reference signal through the secondary cell base station, and informing the terminal to conduct the uplink channel detection at the unauthorized frequency band.

9. The method of claim 8, wherein informing the terminal to conduct the uplink channel detection at the unauthorized frequency band comprises one of:

informing the terminal to conduct the uplink channel detection via activation signaling implicitly, and informing the terminal to stop the uplink channel detection via deactivation signaling implicitly;

informing the terminal to conduct the uplink channel detection via uplink grant signaling sent to the terminal implicitly;

determining new media access layer control signaling comprising multiple indicator bits to inform the terminal to conduct the uplink channel detection, wherein each indicator bit of the multiple indicator bits corresponds to one secondary cell base station, and each indicator bit is used for indicating whether the terminal needs to conduct the uplink channel detection on the secondary cell base station corresponding to each indicator bit; and determining new physical downlink control signaling to inform the terminal to conduct the uplink channel detection on a specified secondary cell base station.

10. The method of claim 1, wherein informing the secondary cell base station to conduct at least one of the uplink channel detection and the downlink channel detection at the unauthorized frequency band comprises:

informing the secondary cell base station to conduct at least one of the uplink channel detection and the downlink channel detection via an interface between the primary cell base station and the secondary cell base station.

11. An apparatus for channel detection notification for a base station, comprising:

a memory configured to store program codes; and at least one processor, wherein, when executed by the at least one processor, the program codes are configured to cause the at least one processor to:

when a LTE system works at an unauthorized frequency band, receive, by a primary cell base station, Radio Resource Management (RRM) measuring results of multiple base stations at the unauthorized frequency band reported by a terminal;

select a secondary cell base station for the terminal according to the RRM measuring results of the multiple base stations;

inform the secondary cell base station to conduct downlink channel detection at the unauthorized frequency band, when it is determined that downlink traffic reaches a set first traffic threshold value; and inform at least one of the secondary cell base station and the terminal to conduct uplink channel detection at the unauthorized frequency band, when it is determined that uplink traffic reaches a set second traffic threshold value.

12. The apparatus of claim 11, wherein the program codes to inform at least one of the secondary cell base station and the terminal to conduct the uplink channel detection at the unauthorized frequency band further comprise program codes to:
inform at least one of the secondary cell base station and the terminal to repeat channel detection at a fixed period at the unauthorized frequency band; or
inform at least one of the secondary cell base station and the terminal to repeat the channel detection at the unauthorized frequency band when receiving traffic to be transmitted.

13. The apparatus of claim 12, wherein the memory further comprises program codes which when executed by the at least one processor causes the at least one processor to:
after choosing the secondary cell base station for the terminal and prior to informing at least one of the secondary cell base station and the terminal to conduct the channel detection, send an adding instruction of the secondary cell base station to the terminal, wherein the terminal is informed that communication service is provided by the secondary cell base station.

14. The apparatus of claim 13, wherein
when at least one of the secondary cell base station and the terminal are informed to repeat the channel detection at the fixed period at the unauthorized frequency band, the adding instruction comprises a start time of the channel detection of at least one of the secondary cell base station and the terminal and at least three of the following parameters: a channel detection duration, a channel detection period, a maximum channel occupancy time, and an idle time; or
when at least one of the secondary cell base station and the terminal is informed to conduct the channel detection at the unauthorized frequency band when receiving the traffic to be transmitted, the adding instruction comprises the channel detection duration and a random number, further wherein
at least one of the secondary cell base station and the terminal chooses the random number when the channel is detected busy,
when the channel is detected busy in the following detection, the value of the random number is configured to be remain unchanged, and
when the channel is detected idle, the random number is decreased by 1 and transmitted until the value of the random number is 0.

15. The apparatus of claim 11, wherein the memory further comprises program codes which when executed by the at least one processor causes the at least one processor to:
when at least one of a scheduling request and a buffer status report sent by the terminal are received, determine whether uplink traffic of an activated service cell of the terminal reaches a second traffic threshold value.

16. The apparatus of claim 11, wherein the memory further comprises program codes which when executed by the at least one processor causes the at least one processor to:
after informing the secondary cell base station to conduct the downlink channel detection at the unauthorized frequency band, send activation signaling of the secondary cell base station to the terminal, wherein after receiving the activation signaling, the terminal monitors a physical downlink control channel of the secondary cell base station, a physical downlink shared channel of the secondary cell base station, and a reference signal sent by the secondary cell base station and measures channel state information of the secondary cell base station; and
after informing the secondary cell base station to conduct the uplink channel detection at the unauthorized frequency band, send the activation signaling of the secondary cell base station to the terminal, wherein after receiving the activation signaling, the terminal sends a probe reference signal.

17. The apparatus of claim 11, wherein the program codes to inform the terminal to conduct the uplink channel detection at the unauthorized frequency band further comprise program codes to:
detect whether the downlink channel of the secondary cell base station is idle; and
when it is detected that the downlink channel of the secondary cell base station is idle, send a downlink reference signal through the secondary cell base station, and inform the terminal to conduct the uplink channel detection at the unauthorized frequency band.

18. The apparatus of claim 17, wherein the program codes to inform the terminal to conduct the uplink channel detection at the unauthorized frequency band further comprise program codes to perform one of:
informing the terminal to conduct the uplink channel detection via activation signaling implicitly, and inform the terminal to stop the uplink channel detection via deactivation signaling implicitly;
informing the terminal to conduct the uplink channel detection via uplink grant signaling sent to the terminal implicitly;
determining new media access layer control signaling comprising multiple indicator bits to inform the terminal to conduct the uplink channel detection, wherein each indicator bit of the multiple indicator bits corresponds to one secondary cell base station, and each indicator bit is used for indicating whether the terminal needs to conduct the uplink channel detection on the secondary cell base station corresponding to each indicator bit; and
determining new physical downlink control signaling to inform the terminal to conduct the uplink channel detection on a specified secondary cell base station.

19. The apparatus of claim 11, wherein the program codes to inform the secondary cell base station to conduct at least one of the uplink channel detection and the downlink channel detection at the unauthorized frequency band further comprise program codes to:
inform the secondary cell base station to conduct at least one of the uplink channel detection and the downlink channel detection via an interface between the primary cell base station and the secondary cell base station.

20. A base station, comprising a channel detection notification apparatus, wherein the channel detection notification apparatus comprises:
a memory configured to store program codes; and
at least one processor, wherein, when executed by the at least one processor, the program codes are configured to cause the at least one processor to:
when a LTE system works at an unauthorized frequency band, receive, by a primary cell base station, Radio Resource Management (RRM) measuring results of multiple base stations at the unauthorized frequency band reported by a terminal;

select a secondary cell base station for the terminal according to the RRM measuring results of the multiple base stations;

inform the secondary cell base station to conduct downlink channel detection at the unauthorized frequency band, when it is determined that downlink traffic reaches a set first traffic threshold value; and inform at least one of the secondary cell base station and the terminal to conduct uplink channel detection at the unauthorized frequency band, when it is determined that uplink traffic reaches a set second traffic threshold value.

* * * * *